United States Patent [19]
Urkowitz et al.

[11] 3,943,346
[45] Mar. 9, 1976

[54] DIGITAL INTERPOLATOR FOR REDUCING TIME QUANTIZATION ERRORS

[75] Inventors: Harry Urkowitz, Philadelphia, Pa.; Richard Prather Perry, Haddon Heights; Leonard Weinberg, Haddonfield, both of N.J.

[73] Assignee: RCA Corporation, New York, N.Y.

[22] Filed: July 22, 1974

[21] Appl. No.: 490,791

[52] U.S. Cl. ............................. 235/152; 324/181
[51] Int. Cl.² ................. G06F 15/34; G06F 7/38
[58] Field of Search ......... 235/152; 444/1; 324/181, 324/188; 328/151

[56] References Cited
UNITED STATES PATENTS

| | | |
|---|---|---|
| 3,412,240 | 11/1968 | Hunt et al. ..................... 235/152 X |
| 3,594,793 | 7/1971 | Aker ............................... 324/181 X |
| 3,725,684 | 4/1973 | Panschow ........................ 235/152 |
| 3,789,203 | 1/1974 | Catherall et al. ................. 235/152 |
| 3,813,529 | 5/1974 | Bartlett ............................ 235/152 |

Primary Examiner—Charles E. Atkinson
Assistant Examiner—Jerry Smith
Attorney, Agent, or Firm—Edward J. Norton; Joseph D. Lazar; Michael A. Lechter

[57] ABSTRACT

A digital processor for discretely sampled information signals, of the type such as radar return signals and communication signals. Means are disclosed for determining the positions and values of extrema and the positions of the leading and trailing edges of extended pulses occurring between sampling instants. Means are also disclosed for determining the duration of such extended pulses.

7 Claims, 6 Drawing Figures

_Fig. 1_

_Fig. 2A_

_Fig. 3_

_Fig. 4_ ance with the present invention.

DIGITAL INTERPOLATOR FOR REDUCING TIME QUANTIZATION ERRORS

The invention described herein was made in the course of or under a contract or subcontract with the Department of the Navy.

BACKGROUND OF THE INVENTION

Any digital representation of a continuous analog function involves describing the function as a sequence of discrete samples. However, the information to be extracted from the function may reside in attributes or characteristics of the waveform that are lost in the sampling process.

For example, in surveillance and communications systems, there is a need to determine extreme values (minimum or maximum values) in a function and the location of such extrema. However, in discrete or digital processors, only discretely sampled values of the function, not necessarily including such extrema, are available.

A specific example is a pulsed radar, which receives successive echoes, corresponding to a given range, as its antenna beam scans over a target. Usually, the information desired from the echoes is the position of the antenna beam as its maximum sweeps over the target, that is, the position of maximum return. However, the successive echoes from the target are separated in time by the interval between transmitted pulses. Consequently, unless the scanning rate is slow compared to the interval between transmit pulses, there may be no echo at the peak of the beam. Thus, the returned echoes "straddle" the beam maximum, resulting in increased uncertainty in the time at which the beam maximum passed over the target and a possible reduction in the size (amplitude) of the echo.

Similarly, in the processing of a particular sweep or range trace, the echo is sampled at times corresponding to particular ranges. Thus, the resultant range output is quantized in steps corresponding to the particular sampled ranges. Consequently, when sampling times "straddle" the position of the peak of a processed echo there is an error in estimation of the time of occurrence of the peak. Such a situation, in particular, occurs in digital processing of the trace.

Time quantization errors also occur in determining the leading and trailing edges of an extended pulse, e.g., in radar the return from a target whose range extent is larger than the range resolution of the radar system.

Related errors occur in digital communications, in radio direction finding, and radio navigation.

Such time quantization errors may be reduced by interpolating the values of the sampled function during the interval occurring between sampling times. The present invention provides a method and apparatus for performing such interpolations.

SUMMARY OF THE INVENTION

The present invention provides a signal processor for data signals indicative of discrete sequential samples of a function. Grouping means receive the data signals and generate signals manifesting the respective values of a group of a predetermined number of the samples in a sequence. Collocation means receive the group signals, collocate a predetermined continuous function to the group of samples and generate information signals indicative of desired information of a predetermined characteristic of the sampled function. The predetermined function has a waveform that approximates the predetermined characteristic of the sampled function.

DETAILED DESCRIPTION OF THE PREFERRED EMBODIMENTS

Time quantization errors often occur when a physical "state", represented by a continuous analog wafeform, or, in general, a continuous function, is discretely sampled. In particular, time quantization errors occur when an analog waveform or function is converted into a digital representation for transmission to a remote processor.

The present invention provides a digital processor which reduces time quantization errors in such digital or discretely sampled systems.

In general terms, the processor iteratively collocates a specified type of curve or function to selected groups of the received sample values. The specified function is chosen to "approximate" the shape of a particular characteristic or attribute of the sampled function which contains or manifests desired information. As will be more fully discussed below, the iterative collocation or "fitting" process, in effect, reconstructs the pertinent portions of the sampled function, in the processor and, consequently, extracted information is not subject to time quantization error. Specified applications, hereinafter discussed, respectively utilize polynomials and Gaussian functions. It should be noted however, that any continuous function, approximating the shape of a desired characteristic or attribute of the sampled function may be used to carry out the invention.

Figure 1:
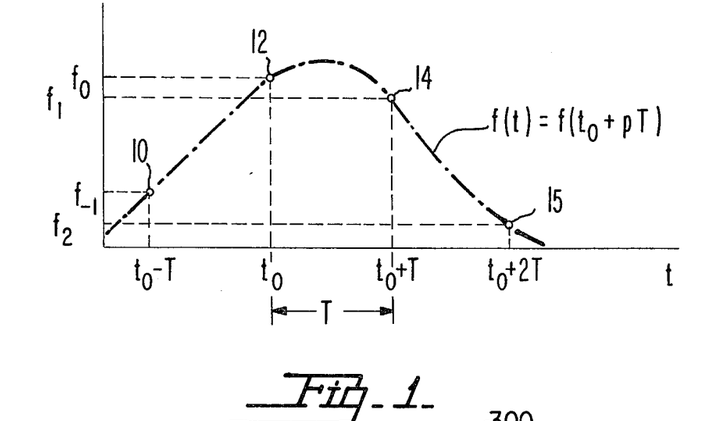
FIG. 1 is a curve plot of typical sampled function.

More specifically, given a plurality of discrete samples ($f(pT)$) of a sampled function $f(t)$, (applied to a processor in accordance with the present invention), a portion of interest of the continuous curve $f(t)$ is to be approximated by, for example, a polynomial of fixed degree passing through the measured samples. FIG. 1 illustrates four such discrete samples, 10, 12, 14 and 15 respectively, taken from a measured function (waveform) with a uniform sampling period T. The sampling instant of one of the samples, here 12, is initially designated time zero, ($t_0$). Accordingly, samples 10, 14, and 15 occur at times ($t_0-T$), ($t_0+T$) and ($t_0+2T$) respectively. The values of the samples 10, 12, 14 and 15 may thus be respectively designated $f_{-1}, f_0, f_1$ and $f_2$.

The collocation polynomial of a given degree for a given set of samples, that is, the polynomial which passes through all the samples, is unique and the coefficients thereof may be determined by application of a suitable mathematical formula. For a detailed description of such formulae reference can be made to "Theory and Problems of Numerical Analysis" by F. Scheid, Schaum's Outline Series, McGraw Hill Book Co., New York 1968, and "Handbook of Mathematical Functions" by M. Abramovitz and I. A. Stegun, N.B.S. Applied Math. Series 55, Washington, D.C., 1964. One such formula is that of Lagrange by which a predetermined function may be fit in the vicinity of some arbitrary time $t_0$. The Lagrange interpolation formula for fitting a specified curve to a group of sample points, neglecting the remainder, may be represented as:

$$f(t) = f(t_0 + pT) = \sum_k A_k^n(p) f_k \qquad (1)$$

where T is equal to the sampling interval, each $f_k$ is equal to the known sample value at the times $t_0 + kT$, i.e.

$$f_k = f(t_0 + kT) \qquad (2)$$

where $k$ is an integer satisfying $$\begin{array}{ll} -(\tfrac{1}{2})(n-2) \leq k \leq n/2, & n \text{ even} \\ -(\tfrac{1}{2})(n-1) \leq k \leq (\tfrac{1}{2})(n-1), & n \text{ odd} \end{array} \qquad (3)$$

Each $A_k^n$ is a polynomial in $p$ of degrees $n-1$ and is termed a "Lagrangian interpolation coefficient".

$$A_k^n(p) = \frac{(-1)^{\frac{1}{2}n+k}}{\left(\frac{n-2}{2}+k\right)!\,(\tfrac{1}{2}n-k)!\,(p-k)} \prod_{x=1}^{n} (p+\tfrac{1}{2}n-x) \quad \text{for } n \text{ even}$$

$$A_k^n(p) = \frac{(-1)^{\frac{1}{2}(n-1)+k}}{\left(\frac{n-1}{2}+k\right)!\,\left(\frac{n-1}{2}-k\right)!\,(p-k)} \prod_{x=0}^{n-1} \left(p+\frac{n-1}{2}-x\right) \quad \text{for } n \text{ odd} \qquad (4)$$

Table 1 gives the values (in p) of the Lagrangian interpolation coefficients and the first and second p-derivatives thereof for $n=3$ and $n=4$. Further tabulations of such Lagrangian interpolation coefficients can be found in the above cited "Handbook of Mathematical Functions".

TABLE I

| Lagrangian Interpolation Coefficients and Derivatives | | | |
|---|---|---|---|
| $n=3$ | | $n=4$ | |
| $A_{-1}^3$ | $(p^2-p)/2$ | $A_{-1}^4$ | $-(p^3-3p^2+2p)/6$ |
| $A_0^3$ | $1-p^2$ | $A_0^4$ | $(p^3-2p^2-p+2)/2$ |
| $A_1^3$ | $(p^2+p)/2$ | $A_1^4$ | $-(p^3-p^2-2p)/2$ |
| $dA_{-1}^3/dp$ | $p-\tfrac{1}{2}$ | $A_2^4$ | $(p^3-p)/6$ |
| $dA_0^3/dp$ | $-2p$ | $dA_{-1}^4/dp$ | $-(3p^2-6p+2)/6$ |
| $dA_1^3/dp$ | $p+\tfrac{1}{2}$ | $dA_0^4/dp$ | $(3p^2-4p-1)/2$ |
| $d^2A_{-1}^3/dp^2$ | 1 | $dA_1^4/dp$ | $-(3p^2-2p-2)/2$ |
| $d^2A_0^3/dp^2$ | $-2$ | $dA_2^4/dp$ | $(3p^2-1)/6$ |
| $d^2A_1^3/dp^2$ | 1 | $d^2A_{-1}^4/dp^2$ | $1-p$ |
| | | $d^2A_0^4/dp^2$ | $3p-2$ |
| | | $d^2A_1^4/dp^2$ | $1-3p$ |
| | | $d^2A_2^4/dp^2$ | $p$ |

It should be noted that the representation of the function given by equation (1) comprises n terms, one term for each sample point to which the cuurve is to be fit. Moreover, it follows from the use of both positive and negative values for k in accordance with equation (3), that sample values occur at times both before and after the sampling instant designated time $0(t_0)$.

Setting $t_0=0$, equation (1) becomes $$f(t) = f(pT) = \sum_k A_k^n(p) f_k \qquad (5)$$

where the respective $f_k$'s equal the values of the function at the sampling times $kT$, $(f_k = f(kT))$. Thus, the interpolation formula fits a polynomial of degree $n-1$ to the n points "surrounding" the sampling point designated time $0(t_0)$. It should be noted that a $n$-degree polynomial must be fit to a minimum of $n+1$ samples at a time. Thus, a second degree polynomial (parabola) and third degree polynomial (cubic) must be fit to respective groupings of at least 3 and 4 samples at a time, i.e., $n=3$ and $n=4$.

Equation (5) is applied to each successive grouping of n points, by successively translating the designated time 0 by the sampling period T. For example, in FIG. 1 with $n=3$, the instant of sampling point 12 is first designated as time $0(t_0)$, thereby defining the polynomial to fit the first three points 10 and 12 and 14. Subsequently, the time zero point is translated by the sampling peroid T and the time of sampling point 14 is designated as the instantaneous time $0(t_0)$. The polynomial, then, is defined by points 12, 14 and 15. The above procedure is followed for all sampling points.

It is often desired to determine information manifested by particular attributes or characteristics of the continuous function (waveform). Typically, the position and value of extrema (maxima or minima) in the sampled function or the position and duration of an extended pulse in the sampled function represent the desired information to be extracted from the function.

According to the present invention, it is noted that, in the vicinity of an extremum, a sampled function is generally parabolic in shape. Hence the extrema of the function are found by collocating a second or higher order polynomial to each succession of n sample points, as described above, and testing the collocated polynomial, within each grouping, for an extremum. An extremum occurs when the p-derivatives of $f(pT)$ vanishes, i.e., goes to zero. Denoting the value of p for which the extremum occurs as $p_m$, $$\frac{df(pT)}{dp} = \frac{d}{dp} \sum_k A_k^n(p) f_k = 0, \; p = p_m \qquad (6)$$

For the exemplary case of n=3 being described, it follows from table I that equation (5) becomes $$f(pT) = (\tfrac{1}{2})(p^2-p)f_{-1} + (1-p^2)f_0 + (\tfrac{1}{2})(p^2+p)f_1 \qquad (7)$$

Thus an extremum occurs for that value $p_m$ of $p$ that satisfies:

$$(p-\tfrac{1}{2})f_{-1} - 2pf_0 + (p+\tfrac{1}{2})f_1 = 0, \; p=p_m \qquad (8)$$

Therefore, $$p_m = \frac{f_{-1}-f_1}{2(f_{-1}-2f_0+f_1)} = \frac{f_{-1}-f_1}{2[(f_{-1}-f_0)+(f_1-f_0)]} \qquad (9)$$

From the second p-derivative it can be determined whether the extremum at $p_m$ is a maximum or a minimum. Accordingly:

$f_{-1} - 2f_0 + f_1 < 0$ indicates that $p_m$ is the location of a maxima (10a)

$f_{-1} - 2f_0 + f_1 > 0$ indicates that $p_m$ is the location of a minimum (10b)

Figure 2:
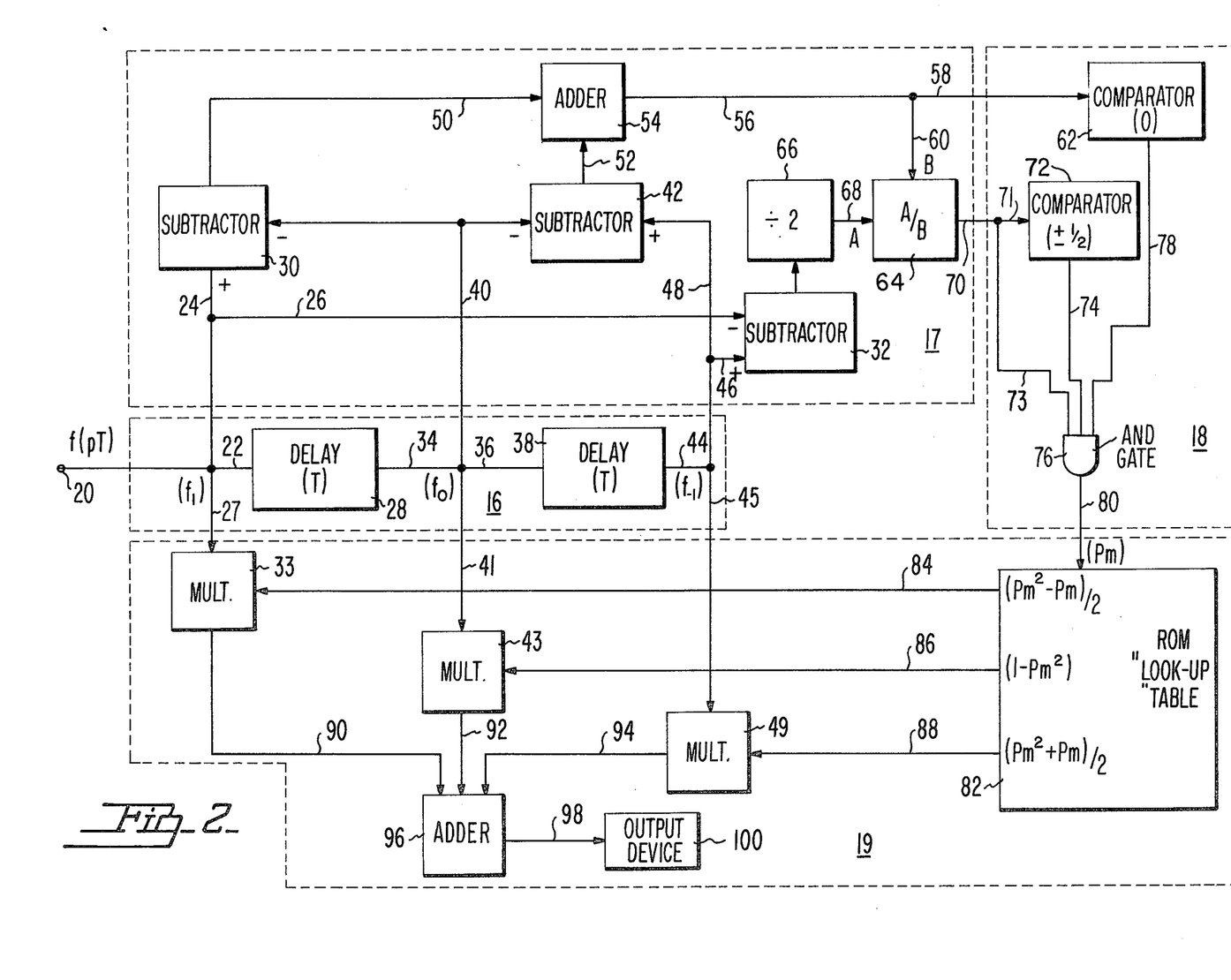
FIG. 2 is a block diagram of one embodiment of a parabolic interpolator according to the invention.

FIG. 2 shows a parabolic interpolator for giving the position and estimated value of an extremum in a sampled function in accordance with the present invention.

In general, a signal representative of the function as sampled, $f(pT)$, is applied to means, generally indicated as 16 for defining the instantaneous n-sample grouping, here, for a parabola, three samples. The values of the respective samples within the instantaneous grouping are applied to means, generally indicated as 17, for locating the position of extrema within the portion of continuous function $f(t)$ defined by the instantaneous sample grouping. The position of an extremum, if any, found by means 17, is in turn applied to control means 18 which, as will be explained, ensures that a particular extremum will be indicated only once and that only the desired type of extremum, e.g., maximum, is indicated. Means 18 accordingly gates the extremum location to means, generally indicated as 19, for calculating the value of the extremum.

More specifically, the signal representative of the function as sampled $f(pT)$, is applied to an input terminal 20 and therefrom over conductors 22, 24, 26 and 27 to a first conventional delay means 28, suitably a shift register, the plus input terminal of a first conventional subtractor 30, the minus input terminal of a second conventional subtractor 32, and a first conventional multiplier 33, respectively. The output signals of delay means 28, are applied over a conductor 34, and therefrom over a conductor 36 to a second conventional delay means 38, over a conductor 40 to the minus input terminals of first subtractor 30 and a third conventional subtractor 42. The output signals of delay means 28 are also directed from conductor 34 over a conductor 41 to a second conventional multiplier 43. The output terminal of second delay means 38 is electrically connected, by way of a conductor 44 and therefrom conductors 45, 46 and 48, to a third conventional multiplier 49 and the plus input terminals of second subtractor means 32, and third subtractor 42, respectively. The output signals of first subtractor 30 and third subtractor 42 are respectively applied over conductors 50 and 52 to a conventional adder 54, the output terminal of which being electrically connected via a conductor 56 and therefrom conductors 58 and 60 to a suitable comparator 62 in control means 18 and to the denominator input of a suitable divider 64, respectively. The output of signals of second subtractor 32 are, in turn, applied through a conventional divider (by 2) 66 and over conductor 68 to the numerator input of divider 64.

The output terminal of divider 64 is connected by conductor 70 to control means 18. Specifically, conductor 70 is connected, by conductors 71 and 73, to a suitable comparator 72 and one input terminal of a conventional three input gate 76, respectively, both comparator 72 and AND gate 76 being within control means 18. The output signals of comparator 72 are applied to a second input terminal of AND gate 76 over conductor 74. The third input terminal of AND gate 76 is receptive of the output signals of first comparator 62 as applied over conductor 78. Output signals from AND gate 76 are applied over conductor 80 to means 19 for calculating the value of the extremum. More specifically, the output signals of AND gate 76 are applied to suitable means for determining the polynomial coefficients, in the preferred embodiment a ROM "lookup table" 82. ROM (read only memory) 82 generates three output signals, respectively, representative of polynomial coefficients in accordance with table I, which are respectively applied over conductors 84, 86 and 88 to multipliers 33, 43 and 49. The output of multipliers 33, 43 and 49 are respectively applied over conductors 90, 92 and 94 to a conventional adder 96, the resultant sum being applied over conductor 98 to a suitable output device 100.

For detailed descriptions of suitable adders, subtractors, multipliers, comparators, and dividers reference is made to "Handbook of Automation, Computation and Control," Volume 2, by Grabbe, Ramo, and Wooldridge, published by John Wiley and Sons, Inc., New York, 1959, Chapter 18.

In operation, means 16 defines the instantaneous grouping of samples, to which the polynomial is to be fitted. More specifically, delays 28 and 38 suitably have values equal to the sampling period T, thus, at a given sampling instant the respective output signals thereof are the two samples immediately previous to the sample instantaneously applied to the input terminal 20. Hence, the sample values at input terminal 20, the output of delay 28 and the output of delay 38 are respectively $f_1$, $f_0$ and $f_{-1}$. Moreover, the n-grouping of samples defined by means 16 is "shifted" by the application of subsequent samples in input terminal 20, in accordance with uniform sampling period T. It will be appreciated by those skilled in this art that means 16 may alternatively comprise other suitable storage and retrieval devices. The values of the samples instantaneously generated by means 16 as $f_{-1}$, $f_0$ and $f_1$ are simultaneously applied in parallel to means 17 which functions to perform electronically the arithmetic operations of equation 8 and thereby determine the position of any extremum within the instantaneous sample grouping. Means 17 also provides for those arithmetic operations, in accordance with the relationships (10), i.e. $(f_{-1} - 2f_0 + f_1)$, needed to determine whether a particular extremum is a maximum or a minimum. Specifically, the output of adder 54 is indicative of this arithmetic term for the instantaneous samples and is accordingly applied, as noted above, over conductor 58 to comparator 62 in control means 18. Comparator 62, in accordance with the relationships (10), compares the resultant term to zero and generates an output signal (logical 1) only when the term indicates the desired type of extremum. For example, comparator 62 may be arranged to produce a one only when the resultant term is less than zero, thereby indicating a maximum. The output signals of comparator 62 are utilized to enable AND gate 76. Thus, AND gate 76 passes only those positions of extrema which are the desired type of extrema, e.g., maxima.

As previously noted, control means 18 also ensures that a particular extremum is indicated only once. In more specific terms, the iterative method of grouping, i.e., the translation of the instantaneous times zero ($t_0$), causes a particular interval between sampling points to be included in a plurality of sample groupings and an extremum in the interval would thus be indicated, if not otherwise provided for, in each grouping. Thus, it is desirable to process a particular extremum only once, for example, when it is close to the instantaneous times zero. This is accomplished by limiting the acceptable values of $p_m$ to values between plus or minus ½. Accordingly, calculated values $p_m$ from means 17 are applied, as noted above, to "comparator" 72 in control means 18. Comparator 72 serves to enable AND gate 76 only for those values of $p_m$ within the defined limits.

Acceptable values of $p_m$ are applied, as noted above, from AND gate 76 in control means 18, over conductor 80, to means 19, wherein the value of the extremum for the particular $p_m$ is calculated in accordance with equation (7), and applied to a suitable output device 100. More specifically, the value of $p_m$ is applied to ROM lookup table 82 which serves to determine and thus calculate the respective Lagrangian interpolation coefficients in accordance with table I. It should be noted that limiting the acceptable values of $p_m$ to between plus or minus one half facilitates the utilization of such a ROM lookup table. However, it will be appreciated by those skilled in the art that the coefficients may be calculated by direct digital hardware implementation similar to that of means 17. Corresponding calculated coefficients and sample values are respectively multiplied in multipliers 33, 43 and 49, with the results being summed in accordance with equation 7 by adder 96. The resultant value of the extremum is displayed or otherwise suitably utilized by output device 100.

While the interpolator of FIG. 2 utilized a parabola to represent the particular characteristics of interest of the sampled function, i.e., the shape of the sample function in the vicinity of an extremum, the extremum regions of certain functions more closely resemble Gaussian curves. For example, many antenna beam patterns are more closely matched by Gaussian curves than parabolas in the vicinity of their maxima. Another example of such a function is the impulse response of a matched filter with time sidelobe suppression.

A Gaussian curve has the form $$g(t) = A \exp[-a(t-t_m)^2] \quad (11)$$

Figures 2A, 3, 4:
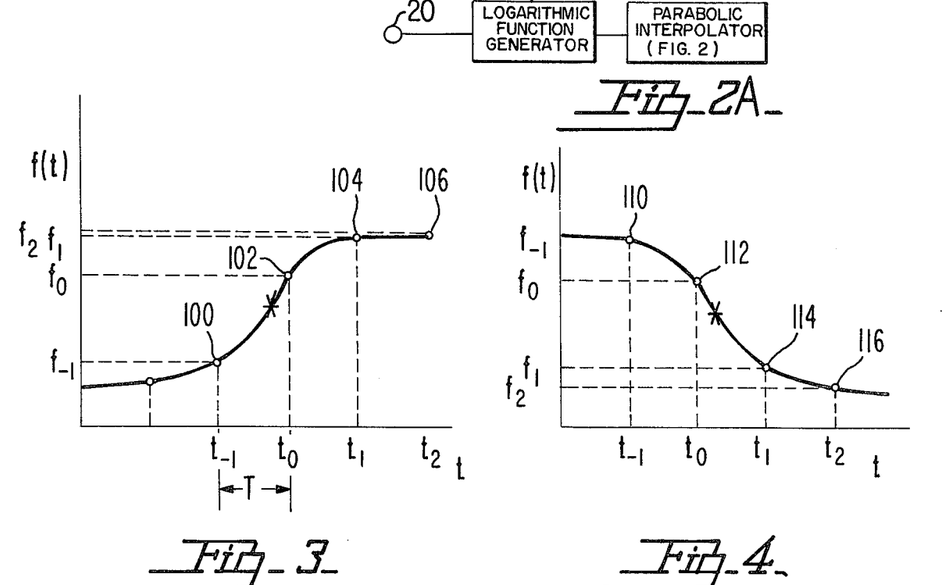
FIG. 2a is a block diagram of one embodiment of a Gaussian interpolator in accordance with the present invention.
FIGS. 3 and 4 are the respective curve plots of the leading and trailing edges of a sampled function.

However, it should be noted that the logarithm (to any base) of a Gaussian curve in accordance with equation 11 yields a parabola. Moreover, the logarithm of a positive function is monotonic with the function and, therefore, both the Gaussian function and the logarithm thereof achieve their maxima at the same instant. Thus, a Gaussian interpolation, in accordance with the present invention, may be performed by taking the logarithm of the respective sample values of a sampled function and applying the resulting sequence of sample to a parabolic interpolator such as that illustrated in FIG. 2. Such a Gaussian interpolator is shown in FIG. 2a. The logarithm of the samples may be taken by any suitable logarithmic function generator 300 or by a suitable ROM lookup table. It should be noted that the logarithmic operation should not be applied previous to any filtering or processing of the sample values intermediate to the actual calculation of the extrema.

As previously noted the position and duration of an extended pulse in the sampled function (waveform) may represent the desired information to be extracted from the function. According to the present invention, it is noted, that while an ideal step function has infinite slope at its transition, realistically, there is no discontinuity at the transitions but rather the transitions are single valued functions of time that may be represented by third or higher order polynomials. Thus, the position and duration of extended pulses in the sampled function are found by fitting a third or higher polynomial to each succession of n sample points, as described above, and testing the polynomial within each n-sample grouping, for points of inflection indicative of the leading or trailing edge of the pulse.

A point of inflection occurs at those points where the second p-derivative of $f(pT)$ goes to zero. Thus, denoting the value of $p$ for which the point of inflection occurs as $p_I$ and taking the second derivative of equation (5), may be represented as:

$$\frac{d^2 f(pT)}{dp^2} = \frac{d^2}{dp^2} \sum_k A_k^n(p) f_k = 0, \, p = p_I \quad (12)$$

For the case of $n=4$, it follows from table I, that equation (5) becomes $$f(pT) = (-1/6)(p^3 - 3p^2 + 2p)f_{-1} + (½)(p^3 - 2p^2 - p + 2)f_0 \\ - (½)(p^3 - p^2 - 2p)f_1 + (1/6)(p^3 - p)f_2 \quad (13)$$

Thus, a point of inflection occurs for that value $p_I$ that satisfies:

$$\frac{d^2 f(pT)}{dp^2} = (-f_{-1} + 3f_0 - 3f_1 + f_2)p + (f_{-1} - 2f_0 + f_1) = 0, \, p = p_I \quad (14)$$

Therefore, $$p_I = \frac{f_{-1} - 2f_0 + f_1}{f_{-1} - 3f_0 + 3f_1 - f_2} \quad (15)$$

FIGS. 3 and 4 respectively illustrate typical leading and trailing edges of an extended pulse represented by a plurality of discrete measured samples, taken at a uniform sampling period T, in FIG. 3: 100, 102, 104 and 106 respectively, and in FIG. 4: 110, 112, 114 and 116 respectively. In FIG. 3, the instant of sample 102 is instantaneously designated time 0 ($t_0$). Accordingly, the values of sample points 100, 102, 104 and 106 are respectively denoted $f_{-1}, f_0, f_1$ and $f_2$. Similarly, in FIG. 4 the time of sample 112 is instantaneously designated as time zero ($t_0$). Accordingly, the values of samples 110, 112, 114 and 116 may be respectively denoted as $f_{-1}, f_0, f_1$ and $f_2$. It should be apparent from FIGS. 3 and 4, that given a point of inflection in an instantaneous sample grouping it may be determined to be indicative of an upward transition (leading edge) or a downward transition (trailing edge) by comparing the value of the sample at times 0 with that of the subsequent sample. Thus, if the $f_1$ is greater than $f_0$ it follows that the transition is upward; if $f_0$ is greater than $f_1$ it follows that the transition is downward.

Figure 5:
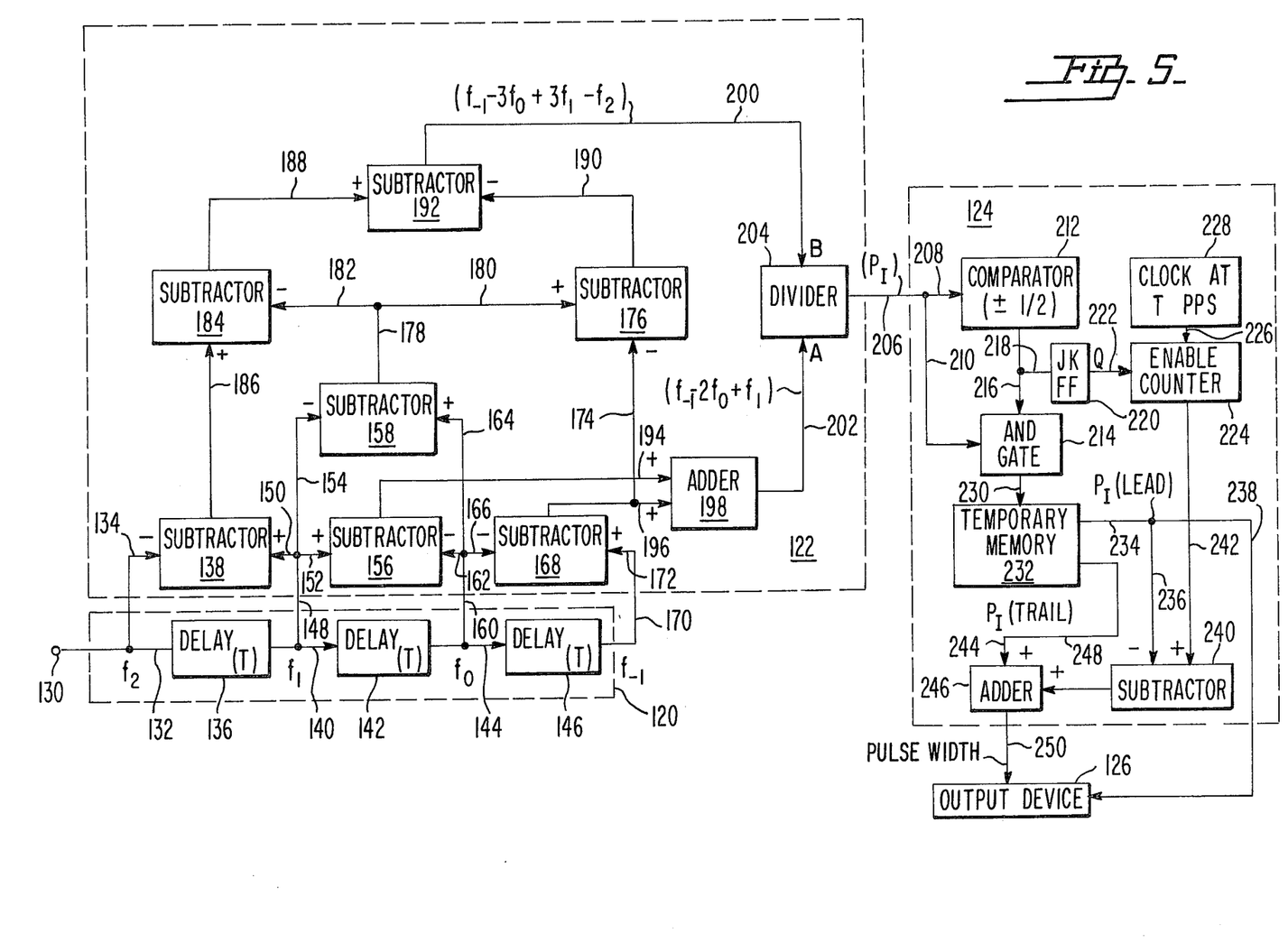
FIG. 5 is a block diagram of a cubic interpolator according to the invention.

FIG. 5 is a block diagram of a cubic interpolator, in accordance with the present invention, for giving the position and duration of an extended pulse in a sampled function. In general, a signal representative of the function as sampled, $f(pT)$, is applied to means, generally indicated as 120, for selecting the instantaneous n-sample grouping, here, four samples. The values of the respective samples within the instantaneous grouping are applied to means, generally indicated as 122, for locating the position of points of inflection in a continuous third degree curve fitted to the selected group of sample points. The position of the points of inflection, if any, found by means 122, are applied to means 124, which, as will be explained, calculates the duration of extended pulses in the sample function. The position of the leading edge and duration as determined by means 124 are applied to a suitable output device 126.

More specifically, the signal representative of the function as sampled, $f(pT)$, is applied to an input terminal 130 and therefrom over conductor 132 to a first conventional delay means 136 in sample group selection means 120. The output signals of delay means 136 are applied over a conductor 140 to a second conventional delay means 142, the output signals of which are in turn, applied over a conductor 144 to a third conventional delay 146.

As noted above, the values of the respective samples within the instantaneous grouping defined by means 120 are applied to means 122 for determining points of inflection in a cubic curve fitted to the sample points. More specifically, the incoming signals at terminal 130 are applied to, in addition to delay means 136, a first conventional subtractor 138 in means 122, over conductor 134, similarly, the output signals from first delay means 136 are applied also over a conductor 148 and therefrom over conductors 150, 152 and 154 to the plus input terminal of subtractor 138, the plus input terminal of a second conventional subtractor 156 and the minus input terminal of a third conventional subtractor 158. Likewise, the output signals of second delay means 142 are applied also over a conductor 160 and therefrom over conductors 162, 164 and 166 to the minus input terminal of second subtractor 156, the plus input terminal of subtractor 158, and to a minus input terminal of a fourth conventional subtractor 168. Output signals from third delay means 146 are applied over a conductor 170 and therefrom over conductors 172 and 174 to the plus input terminal of subtractor 168 and the minus input terminal of a fifth conventional subtractor 176, respectively. The plus input terminal of subtractor 176 is receptive of the output signals of third subtractor 158, as applied from subtractor 158 over conductor 178 and therefrom over conductor 180. The output signals of subtractor 158 are also applied, from conductor 178, over a conductor 182 to a sixth conventional subtractor 184, the plus input terminal of which is receptive of the output signals of subtractor 138 as applied over conductor 186. The output signals of subtractors 184 and 176 are respectively applied over conductors 188 and 190 to the plus and minus input terminals of a seventh conventional subtractor 192. Similarly, the output signals of subtractors 156 and 168 are respectively applied over conductors 194 and 196 to the input terminals of a conventional adder 198. The output signals of subtractor 192 and adder 198 are respectively applied over conductor 200 and 202 to the numerator and denominator input terminals of a suitable divider 204.

The output signals from divider 204 are applied over conductor 206 to means 124 for determining the duration of extended pulses i.e., the time interval between an upward transition and a subsequent downward transition. More specifically, the signals from divider 204 on conductor 206 are applied, over conductors 208 and 210, to a suitable comparator 212 and to one input of a conventional two input AND gate 214, respectively. The other input terminal of AND gate 214 is receptive of signals from comparator 212, over conductor 216. The output of comparator 212 is also applied over conductor 218 to a conventional JK flip-flop 220, arranged to operate in a toggle mode. The Q output terminal of flip-flop 220 is connected by way of conductor 222 to the enable terminal of a conventional counter 224. Counter 224 is also receptive of, over conductor 226, of clock pulses from a conventional clock 228 operating at the sampling rate, T pulses per second.

The output terminal of AND gate 214 is connected by conductor 230 to suitable temporary storage means 232. Storage means 232 is suitably a two-word, sequential access, memory device, which is well known in the art for example, a random access core memory with a sequential counter providing the address or $n$ parallel shift registers, where $n$ is the number of bits in two words. It should be apparent to those skilled in the art, that provisions can be made for loading the positions of a particular point of inflection into an appropriate location in storage means 232 in accordance with the upward/downward transition test set forth above, e.g., a comparator (not shown), receptive of the output signals of subtractor 158, could assign an address in storage means 232 to a particular point of inflection in accordance with the sign of the instantaneous input signal thereto.

Storage means 232 provides, upon command (command circuitry not shown), a first and a second output signal, respectively indicative of the position of the leading and trailing points of inflection. The $p_l$ (lead) signal is applied over a conductor 234 and therefrom over conductors 236 and 238, to the minus input of a conventional subtractor 240 which is also receptive of the output signals from counter 224 which are applied over conductor 242. The $p_l$ (trail) signal from storage means 232 is applied over conductor 244 to a conventional two-input adder 246, the other input terminal of which being connected to output terminal of subtractor 240 by conductor 248. The output signal of adder 246 is applied over a conductor 250 to output device 126.

In the operation of the cubic interpolator shown in FIG. 5, means 120 serves to define the instantaneous grouping of samples, here four samples, to which the polynomial is to be fitted. Specifically, the delays imparted by delay means 136, 142 and 146 suitably have values equal to sampling period T. Thus, at a given sampling instant, the respective output signals thereof are the three samples immediately previous to the sample instantaneously at the input terminal 130. The group of samples instantaneously defined by means 120 is therefore "shifted" by the sampling period T, by the application of subsequent samples, to input terminal 130, in accordance with the uniform sampling period T. Again, it should be appreciated by those skilled in this art that means 120 may alternatively comprise other suitable storage and retreival devices.

As noted above, the values of samples instantaneously within the group defined by means 120 are applied to means 122. Means 122 serves to perform electronically the arithmetic operations of equation 15. Thus, the output signals from means 122 on conductor 206 represent the position of points of inflection by equation 12, and, as previously noted, are applied to means 124. In general, means 124 serves to calculate the time interval between the upward transition (leading edge) and downward transition (trailing edge) of an extended pulse in the sampled function. More specifically, the signals indicative of the position of a point of inflection, $p_l$, are applied, as noted above, to comparator 212. Comparator 212 performs a control function analogous to that of comparator 72 in the parabolic interpolator of FIG. 2 in that it generates an output signal only when the instantaneous $p_l$ is within prescribed limits, i.e., plus or minus one half. Hence, comparator 212 generates an output signal only once for a given point of inflection, that is, when the point of inflection is in the vicinity of the instantaneous time zero. When the given $p_I$ is within the prescribed limits, comparator 212 enables AND gate 214 and the given $p_I$ is loaded into an appropriate location in the temporary storage means 232, in accordance with whether it is a leading or trailing edge, as explained above. As noted above, the output of comparator 212 is utilized to toggle JK flip-flop 220. JK flip-flop 220 is initially in a reset state and is subsequently set by the first $p_I$ (upward transition) within the prescribed limit of comparator 212. Flip-flop 220, in turn, enables counter 224, which increments from zero at the sample rate until flip-flop 224 is reset by the next $p_I$ (downward transition) that comes within the prescribed limits of comparator 212. It should be apparent, to those skilled in the art, that provisions can be made to ensure that counter 224 is enabled only by a leading edge and stopped by a trailing edge of an extended pulse. For example, flip-flop 220 may alternatively be an R–S type flip-flop with the R and S input terminals being respectively receptive of the output signals of comparator 212, respectively AND gated with the appropriate output signals of the comparator (not shown) utilized to assign locations in storate means 232.

After the positions of both the leading and trailing edges have been stored in memory 232, a command sequence is initiated (logic not shown), causing the contents of counter 224 and the $p_I$ (lead) signal from storage means 232 to be simultaneously applied to subtractor 240. Subsequently, the $p_I$ (trail) output signal of memory 232 and the output signal of subtractor 240 are simultaneously applied to adder 246. Subtractor 240 and adder 246 serve to perform the arithmetic operation required to determine duration of extended pulse. The position of the leading edge and pulse width of extended pulse are displayed or otherwise suitably utilized by output device 126.

While the interpolator of FIG. 5 utilizes a cubic function to represent the transitions of extended pulses in the sampled function, certain functions, for example those functions wherein the extremum regions closely match a Gaussian curve, the transitions of extended pulses may be more closely represented by an error function (erf(t)) equal to the integral of a Gaussian curve. That is:

$$\text{erf}(t) = 2/\sqrt{\pi} \int_0^t \exp(-x^2)dx \qquad (16)$$

However, it should be noted that the derivatives of such curves are Gaussian functions, and consequently, Gaussian interpolation, as described above, can be applied to the derivatives. The position of an extremum of the Gaussian curve is at the same instant as the point of inflection of the corresponding error function curve. A maximum of the Gaussian curve corresponds to an upward transition in the error function curve. Similarly, a minimum corresponds to a downward transition. Thus, an error function interpolation can be realized by applying the respective samples of the sampled function to a suitable discrete or digital differentiator, applying the differentiated samples to a suitable logarithmic function generator, and applying the output signals thereof to a parabolic interpolator such as that shown in FIG. 2. It should be noted that the digital differentiator is not simply a differencing device, but rather a device which provides sample values of the continuous derivative of the sampled function. Concerning the design of such digital differentiators, reference is made to "Digital Filters" by Kaiser, Chapter 7 in "Systems Analysis by Digital Computer" by Kuo and Kaiser, eds., New York, Wiley, 1966, "Computer Aided Design of Recursive Digital Filters" by Steiglitz, and "The Design of Wideband Recursive and Nonrecursive Digital Differentiators" by Rabiner and Steiglitz, respectively on pages 123 through 129 and 204 through 209 of IEEE Transactions on Audio and Electroacoustics, Volume AU-18, No. 2, June 1970. The implementation described may be performed using sample values represented as voltage levels on a single line or as digital words represented by multiple lines.

It should be noted, that while the conductors interconnecting various elements in the drawings are shown as single lines, they may actually comprise plural connections.

It should be appreciated from the foregoing description of the preferred embodiment that the present invention provides means for processing discretely sampled data, that is relatively immune to time quantization error. This is accomplished as described above by successively collocating a specified function representative of the characteristic or attribute of the sampled function containing the desired information, to successive groups of sample values. Thus, the pertinent portions of the sampled function are, in effect, reconstructed within the processor and, consequently, information extracted from the reconstructed function is not subject to the time quantization error inherent in, for example, analog to digital conversion.

It should be appreciated that the present invention has particular utility in the fields of digital communications, radio direction finding and radio navigation.

In digital communication, where an information bearing waveform is converted to digital symbols, as by a plurality of different filters, the present invention allows the use of slower sampling rates with little information loss.

Moreover, in some forms of telegraphic transmission, transmitted symbols are recognized by duration or pulse width of the signals. A digital interpolator in accordance with the present invention finds particular utility in such systems in processing digital versions of the received waveforms where low or moderate sampling rates are used.

In addition, the time of occurrence of a leading edge or of a peak of a synchronizing symbol is required to be determined in many synchronization techniques. Such synchronization techniques are used in many forms of communication and broadcasting such as, for example, television. The present invention allows for low sampling rates to be used in such communication systems using digital processing in the receiver, without appreciable loss in accuracy in locating the desired edges or peaks of the signals.

Many radio direction finding systems seek a null in a received waveform as the system antenna scans through an angular interval. The present invention is useful in detecting such nulls, where the envelope of the received waveform is converted into digital form. A digital interpolator in accordance with the present invention allows for accurate location even with a low sampling rate of the null or minimum in the waveform.

Hyperbolic navigation techniques, e.g., Loran, commonly involve the alignment of pulses or waveform portions such as the leading edge or peak thereof. The present invention may be utilized in a digital processor in such a system, to provide accurate alignment at low sampling rates.

It will be understood that the above description is of illustrative embodiments of the present invention, and that the invention is not limited to the specific forms shown. Modifications may be made in the design and arrangement of elements without departing from the spirit of the invention as will be apparent to those skilled in the art.

What is claimed is:

1. A signal processor for extracting desired information from discrete sequential samples of a time-varying function, said information relating to extrema or durations of predetermined portions of said time-varying function, and being manifested in said time-varying function by a characteristic shape, comprising:

first means, receptive of data signals indicative of said sequential samples, for iteratively selecting consecutive groups of a predetermined number of said sequential samples and generating signals consecutively indicative of the respective values of such samples within each consecutive group of samples;

second means, receptive of said group signals, for collacating a predetermined continuous function in sequence to each respective consecutive group of samples, said predetermined function having a predetermined shape that approximates said characteristic shape in said time-varying function, said second means generating an output signal indicative of the instant of occurrence of indicia of said desired information in said predetermined function with respect to a given one of said samples within each of said groups;

third means, receptive of said occurrence signal, for comparing said instant of occurrence to preset threshold values, and providing an output signal indicative of said occurrence only when said location is within said preset threshold values, ensuring thereby that the information manifested by a particular occurrence of said indicia is indicated in only one of said consecutive groups; and fourth means, receptive of said third means output signal, for deriving from said third means output signal a signal indicative of said desired information, whereby said information is interpolated from said discrete samples.

2. The signal processor of claim 1 wherein said desired information is the value of extrema of said sampled time-varying function, and wherein further:

said first means generates signals indicative of the respective values of consecutive groups of first, second and third sequential samples;

said second means comprises:

first, second and third subtractors, each having a positive and a negative input terminal, for generating output signals having a value equal to the value of signals applied to the respective positive input terminals minus the value of signals applied to the respective negative input terminals; an adder for generating an output signal having a value equal to the sum of the values of respective signals applied thereto; a first divider for generating an output signal having a value equal to the values of signals applied thereto divided by two; and a second divider, having first and second input terminals, for generating an output signal having a value equal to the value of signals applied to the first input terminal thereof divided by the value of signals applied to the second input terminal thereof;

said first sample signal being applied to the positive input terminals of said second and third subtractors; said second sample signal being applied to the negative input terminals of said first and third subtractors; said third sample signal being applied to the positive input terminal of said first subtractor and the negative input terminal of said second subtractor; said second subtractor output signal being applied to said first divider; said first and third subtractor output signals being applied to said adder; said first divider output signal being applied to said first input terminal of said second divider; and said adder output signal being applied to said second input terminal of said second divider;

said second divider output signal being indicative of the instants of occurrence of said extrema in said predetermined function with respect to said second sample.

3. The signal processor of claim 2, wherein said fourth means comprises:

fifth means, responsive to said third means output signal, for generating signals indicative of respective Lagrangian interpolation coefficients of a third degree polynomial function in accordance with said instants of occurrence and sixth means, responsive to said coefficient signals and said first, second and third sample signals, for generating a signal indicative of the value of said sampled function at said extrema.

4. The signal processor of claim 3, wherein said predetermined function is a Gaussian curve; and wherein further:

said first means includes means for generating signals indicative of the logarithm of said sequential samples and generates signals indicative of the logarithm of the respective values of said consecutive groups of first, second and third samples.

5. The signal processor of claim 2 further including fifth means, responsive to said adder output signal, for sensing the sign of said adder output signal, to determine thereby whether said extrema are maximums or minimums.

6. The signal processor of claim 1, wherein: said first means generates signals indicative of consecutive groups of first, second, third and fourth samples;

and said second means comprises:

first, second, third, fourth, fifth, sixth, and seventh subtractors, each having a positive and a negative input terminal, for generating signals having values equal to the value of signals applied to the respective positive input terminals minus the values of signals applied to the respective negative input terminals; an adder for generating an output signal having a value equal to the sum of the values of the respective signals applied thereto; and a divider having first and second input terminals for generating an output signal having a value equal to the value of signals applied to the first input terminal divided by the value of signals applied to the second input terminal;

said first sample signal being applied to the positive input terminal of said fourth subtractor; said second sample signal being applied to the negative input terminals of said second and fourth subtractors, and to the positive input terminal of said third subtractor; said third sample signal being applied to the positive input terminals of said first and second subtractors and to the negative input terminal of said third subtractor; said fourth sample signal being applied to the negative input terminal of said first subtractor; said first subtractor output signal being applied to the positive input terminal of said sixth subtractor; said second subtractor output signal being applied to said adder; said third subtractor output signal being applied to the positive input terminal of said fifth subtractor and to the negative input terminal of said sixth subtractor; said fourth subtractor output signal being applied to said adder and to the negative input terminal of said fifth subtractor; said fifth subtractor output signal being applied to the negative input terminal of said seventh subtractor; said sixth subtractor output signal being applied to the positive input terminal of said seventh subtractor; said seventh subtractor output signal being applied to said second terminal of said divider; and said adder output signal being applied to said first input terminal of said divider;

said divider output signal being indicative of the instants of occurrence of points of inflection in said predetermined function with respect to said second sample.

7. The signal processor of claim 6, wherein said information is the duration of an extended pulse within said time varying function, and wherein further, said fourth means comprises:

fifth means, responsive to said third means output signal for generating first and second output signals respectively indicative of the instants of occurrence of first and second consecutive points of inflection;

sixth means, receptive of said third means output signal, for generating a signal indicative of the number of samples occurring between said first and second inflection points;

an eighth subtractor, receptive of said sixth means output signal and said fifth means first output signal, for generating an output signal having a value equal to said number of samples minus said instant of occurrence of said first point of inflection; and a second adder, receptive of said eighth subtractor output signal and said signal indicative of the instant of occurrence of said second point of inflection, for generating an output signal having a value equal to the sum of the values of said eighth subtractor output signal and said instant of occurrence of said second point of inflection;

said second adder output signal being indicative of said pulse width.

* * * * *